United States Patent
Castanie et al.

(10) Patent No.: US 9,905,319 B2
(45) Date of Patent: Feb. 27, 2018

(54) PLATE HEAT EXCHANGER FOR HOMOGENEOUS FLUID FLOWS BETWEEN DUCTS

(71) Applicant: Société Technique pour l'Energie Atomique Technicatome, Villiers le Bacle (FR)

(72) Inventors: Christophe Castanie, Marseilles (FR); Jean-Yves Charcosset, Venelles (FR)

(73) Assignee: SOCIETE TECHNIQUE POUR L'ENERGIE ATOMIQUE, Villiers le Bacle (FR)

( * ) Notice: Subject to any disclaimer, the term of this patent is extended or adjusted under 35 U.S.C. 154(b) by 235 days.

(21) Appl. No.: 14/405,770

(22) PCT Filed: Jun. 5, 2013

(86) PCT No.: PCT/EP2013/061540
§ 371 (c)(1),
(2) Date: Dec. 4, 2014

(87) PCT Pub. No.: WO2013/182584
PCT Pub. Date: Dec. 12, 2013

(65) Prior Publication Data
US 2015/0179287 A1    Jun. 25, 2015

(30) Foreign Application Priority Data
Jun. 5, 2012  (FR) ...................................... 12 55233

(51) Int. Cl.
*G21C 1/32*      (2006.01)
*F28F 9/02*      (2006.01)
(Continued)

(52) U.S. Cl.
CPC ........... *G21C 1/322* (2013.01); *F28D 9/0037* (2013.01); *F28D 9/0043* (2013.01); *F28F 3/08* (2013.01);
(Continued)

(58) Field of Classification Search
CPC .... F28D 7/06; F28D 2021/0054; F28D 15/00; F28D 15/0266; F28D 15/0275;
(Continued)

(56) References Cited

U.S. PATENT DOCUMENTS 4,073,340 A    12/1978  Parker
4,665,975 A *   5/1987  Johnston ............... F28F 9/0275
165/167
(Continued)

FOREIGN PATENT DOCUMENTS

CN    101154472 A    4/2008
DE    10160380 A1    6/2003
(Continued)

OTHER PUBLICATIONS

International Search Report for corresponding International Application PCT/EP2013/061540.

*Primary Examiner* — Jack W Keith
*Assistant Examiner* — Daniel Wasil
(74) *Attorney, Agent, or Firm* — Davidson, Davidson & Kappel, LLC

(57) ABSTRACT

A plate heat exchanger for homogenous fluid flows between ducts includes primary passages and secondary passages. The secondary passages include a first group fluidly connecting a first secondary supply collector to a secondary discharge collector. The first group of secondary passages have a first total passage section at half-length between the first secondary supply collector and the secondary discharge collector. The first group of secondary passages have a
(Continued)

second total passage section at the output of the first secondary supply collector of less than 10% of the first total passage section of the first group of secondary passages.

14 Claims, 6 Drawing Sheets

(51) Int. Cl.
*F28D 9/00* (2006.01)
*F28F 3/08* (2006.01)
*F28D 21/00* (2006.01)

(52) U.S. Cl.
CPC .... *F28F 9/0268* (2013.01); *F28D 2021/0054* (2013.01)

(58) Field of Classification Search
CPC .... F28D 17/00; F28D 1/0213; F28D 21/0003; F28D 7/10; F28D 7/163; F28D 15/0233; F28D 20/0039; F28D 9/0025; F28D 9/0037; F28D 9/0043; F28F 3/08; F28F 9/0268; G21C 1/322

USPC .......................................................... 376/406
See application file for complete search history.

(56) References Cited

U.S. PATENT DOCUMENTS

| | | | |
|---|---|---|---|
| 5,268,942 A * | 12/1993 | Newton | G21C 15/182 376/272 |
| 6,389,696 B1 * | 5/2002 | Heil | F28D 9/005 165/139 |
| 2010/0051248 A1 | 3/2010 | Inatomi et al. | |
| 2010/0293946 A1 | 11/2010 | Vick | |

FOREIGN PATENT DOCUMENTS

| | | |
|---|---|---|
| EP | 2110635 A1 | 10/2009 |
| EP | 2161528 A2 | 3/2010 |
| FR | 2225711 A1 | 11/1974 |
| GB | 1471212 A | 4/1977 |

* cited by examiner

PLATE HEAT EXCHANGER FOR HOMOGENEOUS FLUID FLOWS BETWEEN DUCTS

The invention generally relates to plate heat exchangers.

More specifically, the invention according to a first aspect relates to a plate heat exchanger, the exchanger being of the type comprising:

- a plurality of plates stacked upon each other, the plates alternately delimiting between them a plurality of primary passages and a plurality of secondary passages, the primary passages being provided for circulation of a primary fluid and the secondary passages being provided for circulation of a secondary fluid;
- a first collector for supplying the secondary passages with the secondary fluid and a collector for discharging the secondary fluid into which open the secondary passages;
- the plates being parallel to a determined longitudinal axis and having a common middle plane containing the longitudinal axis.

BACKGROUND

US 2010/0051248 describes in FIGS. 1 and 2 a plate heat exchanger of the above type. This plate exchanger may be laid out with difficulty in the vessel of a nuclear reactor, so as to be attached as a cantilever on the vessel, while allowing circulation of a stable and homogenous fluid in primary and secondary passages.

SUMMARY OF THE INVENTION

Within this context, the invention is directed to proposing a plate heat exchanger which may be easily laid out in the vessel of a nuclear reactor, while guaranteeing stable and homogenous flow in the primary and secondary passages.

For this purpose, the invention deals with a plate heat exchanger of the aforementioned type, characterized in that:

- the exchanger comprises a second secondary supply collector, the first and second secondary supply collectors and the secondary discharge collector being made in the plates and substantially extending perpendicularly to the plates,
- the secondary discharge collector is located at a first longitudinal end of the plates in the middle plane, the first and second secondary supply collectors being located at a second longitudinal end of the plates opposite to the first, symmetrically relatively to the middle plane and away from the middle plane.

Such an arrangement of the supply collectors and of the secondary discharge collector gives the possibility of hanging the heat exchanger from the wall of a vessel via the secondary discharge collector. The plate exchanger in this case is typically placed with its longitudinal axis oriented along the vertical direction. The secondary discharge collector is placed towards the top. The secondary discharge collector typically opens out of the plate exchanger through an outlet orifice surrounded by an attachment flange. Attachment members, for example screws or tie rods, allow the exchanger to be attached to the vessel via the flange. In this case, the vessel typically includes a crossbar having an internal passage placed coinciding with the outlet of the secondary discharge collector.

The fact that the first and second secondary supply collectors are located at the second longitudinal end of the plates, symmetrically relatively to the middle plane and away from this middle plane, gives the possibility of designing the secondary passages so that all these secondary passages substantially have the same length. Such a layout would not be possible for example with a single secondary supply collector located in the middle plane, in particular when the intention is to make a large number of secondary passages at a same level of the exchanger, i.e. between two given plates. On the contrary, the fact of placing two secondary supply collectors symmetrically away from the middle plane leaves much more freedom for designing a large number of secondary passages, with substantially identical length at a same level of the exchanger.

The fact that the secondary passages have the same length is important for obtaining homogenous circulation rates of the secondary fluid in the secondary passages. If certain secondary passages were shorter and other ones longer, the circulation rate of the secondary fluid would be slower in the longer channels and faster in the shorter channels. This may cause temperature heterogeneities within the plate exchanger, generate thermomechanical stresses at the exchanger as well as an efficiency loss of the primary/secondary exchange (poor use of a portion of the exchange surface area).

The plate heat exchanger is typically provided for being used in a nuclear reactor, notably in a nuclear reactor of small or medium size. Provision is typically made for transfer of heat from the primary fluid of the nuclear reactor to the secondary fluid. The primary fluid is heated by circulating in the core of the nuclear reactor.

Typically, the primary fluid is water and the secondary fluid is also water. In this case, the heat exchanger is typically a steam generator. The secondary fluid penetrates into the heat exchanger in liquid form. It is vaporized under the effect of the heat given off by the primary fluid and leaves the heat exchanger as steam.

Alternatively, the primary and secondary fluids are not water. For example, the primary and/or secondary fluids are liquid metals such as liquid sodium, or gases.

The plate heat exchanger, as indicated above is typically provided for being positioned inside the vessel of a nuclear reactor. This vessel also contains the core of the nuclear reactor and different internal components.

Alternatively, the plate exchanger may not be located in the vessel of a nuclear reactor but be inserted into the primary circuit of a nuclear reactor, out of the vessel. It may also be used in an industrial installation other than a nuclear reactor.

The plates of the heat exchanger are typically superposed on each other, parallel to each other. The middle plane (plane P in FIGS. 2 and 3) is typically perpendicular to the plates. The first and second secondary supply collectors are typically as far away as possible from the middle plane. They are also, preferably shifted as far as possible towards the second longitudinal end of the plates.

This facilitates the laying out of secondary passages of same length in a same level of the exchanger, and consequently also promotes the laying out of primary passages of same length in a same level of the exchanger.

Advantageously, the primary and secondary passages are dug in large faces of plates, called primary and secondary plates respectively. A particularly robust and compact plate exchanger is thereby obtained. The primary and secondary passages are typically cut in the primary and secondary plates. They are open at the large faces of the primary and secondary plates. In other words, the primary and secondary passages are grooves formed in the bulk of the primary and secondary plates. Each primary and secondary plate has a first large face in which are formed passages and a second large face without any passages. When the primary and secondary plates are stacked on each other alternately, the second large face of a given plate will close the passages of the plate located just under it.

Alternatively, the primary and secondary passages are machined in the first large faces, for example with a laser or any other type of machining (photochemical, mechanical . . . ).

Alternatively, each plate bears grooves on its two large faces. These grooves coincide with each other when the plates are stacked. The facing grooves located between two given plates define primary or secondary passages.

Alternatively, the primary and secondary passages are not dug in the large faces of primary and secondary plates but for example are delimited by inserts laid out between plates.

Typically, a level consisting of a row of primary passages (primary level) is surrounded by two levels with secondary passages (secondary level), and vice versa. Alternatively, a primary level, two secondary levels, a primary level, etc. are successively placed. It is also possible to place two primary levels, and then two secondary levels, and then two primary levels, etc. Other configurations may be contemplated.

Preferably, the secondary passages have respective developed lengths comprised between L0+10% and L0−10%. L0 is here a predetermined reference length. Thus, all the secondary passages substantially have the same developed length. By developed length is meant here the length covered when a secondary passage is followed from a secondary supply collector as far as the secondary discharge collector. It should be noted, as this will be described later on, that several secondary passages may share a common segment, notably an upstream segment opening into a secondary supply collector. These passages separate from each other downstream from the common segment. In this case, by developed length is meant here the total length of the passage, including that of the common segment. Preferably, the secondary passages have developed lengths comprised between L0+5% and L0−5%, and still preferably comprised between L0+2% and L0−2%.

Because the secondary passages all have substantially equal developed lengths, the secondary fluid substantially has the same rate profile in all the secondary passages. Therefore it also has substantially the same temperature profile along all the secondary passages.

From a thermo-hydraulic point of view, this allows control of the distribution of the flow rates between the various secondary channels and therefore the balance of the power exchange in the different channels. Thus, the whole exchange surface area of the plate is efficient as regards heat exchange.

There also results that there is no differential expansion between various areas of a same plate or between two secondary plates. This is particularly important because the plates are generally welded to each other and therefore form a particularly rigid block. This allows reduction in the thermomechanical stresses within the plate exchanger and reduction of the risk of occurrence of cracks or leaks in the long term.

Also, the primary passages preferably have respective developed lengths comprised between L1+10% and L1−10%.

Thus, all the primary passages substantially have the same developed length. L1 is here a predetermined reference length. L1 is generally different from L0. Preferably, the primary passages have developed lengths comprised between L1+5% and L1−5%, and still preferably comprised between L1+2% and L1−2%.

As earlier, this gives the possibility of obtaining similar rate profiles for the primary fluid in the primary passages, and similar temperature profiles along the primary passages. This contributes to improving the efficiency of the primary/secondary heat exchange and to reducing the thermomechanical stresses in the plate exchanger, Typically, the secondary discharge collector has a V-shaped cross section. By cross section is meant here the section of the secondary discharge collector, taken perpendicularly to its central axis. The latter is typically rectilinear and perpendicular to the plates. In other words, the secondary discharge collector typically has a substantially constant V-shaped cross-section over the whole of its length. Such a shape is particularly advantageous for allowing the laying out of secondary passages all having the same developed length.

Indeed, the V typically points longitudinally towards the second longitudinal end of the plates. The tip of the V is typically located in the middle plane. The secondary discharge collector is thus delimited by two planar surfaces tilted relatively to each other. These planar surfaces join up along an edge, forming the point of the V, located in the middle plane. The planar surfaces, from said edge, move away from the middle plane and extend towards the first longitudinal end of the plates. The secondary passages open into either one of the two planar surfaces. Certain secondary passages open near the edge while other ones open into areas away from the edge. This gives the possibility of varying the length of the upper terminal portions of the secondary passages. Such variations may notably compensate for the differences in lengths between the secondary passages in the low terminal portions of these passages.

Alternatively, both surfaces may not be entirely planar and be locally or totally curved. Also, they may not form a V, but form a U or a slot or have any other suitable shape.

The first and second secondary supply collectors have together a first total passage section, the secondary discharge collector having a second passage section. The ratio between these first and second passage sections should take into account the change in phase of the fluid if required. Typically, for a steam generator application, the second passage section should be greater than three times the first passage section, and preferably greater by 10 times. The first passage section corresponds here to the sum of the respective passage sections of the first and second secondary supply collectors. These sections typically correspond to the cross sections of the first and second secondary supply collectors. Thus, the passage section of the secondary discharge collector is much larger than the passage section of the secondary supply collectors.

This first allows limitation in the flow rate of the secondary fluid in the secondary discharge collector. This is important when the heat exchanger is a steam generator. Moreover, this gives the possibility of laying out a larger number of secondary passages in the vicinity of the secondary discharge collector. Indeed, between two given plates, the space available in the vicinity of the secondary discharge collector for letting through the secondary passages is smaller than in the central segments of the plates, located at a distance from both longitudinal ends of the plates. It is therefore necessary to reduce the number of secondary passages opening into the secondary discharge collector by merging the terminal portions of several secondary passages. However, this reduces the available passage section for the secondary fluid and therefore generates a significant pressure drop. In the invention, the selection of a secondary discharge collector of a large size allows limitation in the reduction of the number of secondary passages in the vicinity of the secondary discharge collector. Typically, if a central segment of the secondary plate located longitudinally at a half distance between both longitudinal ends of the plate is considered, this intermediate segment is crossed by a number N1 of secondary passages. The number of secondary passages opening into the secondary discharge collector as for it has the value N2. In the invention, N2 is comprised between 0.7 times N1 and N1 preferably. In other words, the reduction in the number of secondary passages between the central segment and the entry into the secondary discharge collector is preferably less than 30%.

This also allows limitation of the pressure drops for the secondary fluid crossing the heat exchanger.

Preferably, the exchanger comprises first and second groups of secondary passages fluidically connecting the first and second secondary supply collectors to the secondary discharge collector respectively, the first and second groups of secondary passages each having a first total passage section at half-length between the first and second secondary supply collectors and the secondary discharge collector respectively, the first and second groups of secondary passages each having a second total passage section less than 10% of the first passage section at the output of the first and second secondary supply collectors respectively.

In other words, for a steam generator application, if the first group of secondary passages is considered, the latter provides at the output of the first secondary supply collector a reduced passage section, much smaller than the passage section for example provided at half-travel between the collectors. The situation is the same for the second group of secondary passages, serving the second secondary supply collector.

A group of diaphragms at the output of the supply collectors is thereby generated. These diaphragms are located immediately downstream from the first and second secondary supply collectors. These diaphragms contribute to maintaining a high pressure in the secondary supply collectors, and thus give the possibility of obtaining secondary fluid flow rates substantially equal in the different secondary passages. In an application of the steam generator type, they also contribute to excluding the risk of flow rate instabilities between the different rows of secondary passages located at different levels of the exchanger under diphasic conditions, by imposing a significant and calibrated pressure drop in the area where the fluid is a monophasic liquid at the entry of the plate. Further, the number of secondary passages leaving the secondary supply collectors being smaller than the one obtained at half-length between the first and second secondary supply collector and the secondary discharge collector, a transition area where the number of passages gradually increases, is generated in the low portion of the secondary plates.

Advantageously, the primary passages of a same primary level are entirely separate from each other. In other words, the primary passages of a same primary level do not communicate with each other. The primary fluid cannot pass from a primary passage to another one. In the case when the primary passages are dug in the primary plates, this contributes to generating a significant supporting surface of the first large face of the primary plate on the second large face of the plate which covers the primary plate. This is particularly important in the case when the plates are welded to each other by diffusion bonding. The rectilinear primary passages without any interruption on the largest portion of the trajectory of the primary fluid allow limitation of the pressure drops in the crossing of the exchanger.

Advantageously, each secondary level includes a plurality of secondary passages communicating with each other.

Thus, the secondary passages of a same level are separated from each other by interrupted isthmi. Thus, a given isthmus, separating two neighboring secondary passages, has several interruptions allowing the secondary fluid to pass from one secondary passage to another. These interruptions are preferably regularly distributed over the whole length of the secondary passages. One thus avoids the creation of inter passage instabilities.

This also contributes to uniformizing the secondary fluid flow rates in the different secondary passages. This contributes to ensuring that the rate profiles and the temperature profiles along the different secondary passages are uniform.

Further, in the case when the secondary passages are dug in the secondary plates, the isthmi separating the secondary passages themselves also contribute to generating a sufficient supporting surface for the first large faces of the secondary plate on the second large faces of the primary plate which covers them. Indeed, the interruptions, all in all, only extend over a small length of the secondary passages.

More specifically, at each secondary level between two given plates, the number of secondary passages is substantially constant in a middle portion between the first and second secondary supply collectors and the secondary discharge collector. As indicated above, the number of secondary passages is reduced in a second portion upon approaching the secondary discharge collector from the middle portion. The secondary passages are separated from each other, in the second portion, both by discontinuous isthmi and by continuous isthmi, the latter in fact delimiting a certain number of groups of channels with discontinuous isthmi (typically 8 groups of channels). By continuous isthmi are meant here isthmi which do not have any discontinuity between the middle portion as to the secondary discharge collector.

Symmetrically, the number of secondary passages increases in a third portion upon approaching the middle portion from the first and second secondary supply collectors, as described above. The secondary passages are separated in the third portion both by discontinuous isthmi and by continuous isthmi, the latter in fact delimiting a certain number of groups of channels with discontinuous isthmi (typically 8 groups of channels). By continuous isthmi are meant here isthmi which do not have any discontinuity from the first and second secondary supply collectors to the middle portion.

In the middle portion, the secondary passages are only separated from each other by discontinuous isthmi. There are no continuous isthmi.

In the second and third portions, the continuous isthmi are regularly distributed, in the sense that the same number of discontinuous isthmi is substantially found between two neighboring continuous isthmi.

In the second and third portions, the path of the secondary passages is windy, with several changes in direction. The continuous isthmi force the secondary fluid to be distributed over the width of the secondary level, and contribute to obtaining a uniform flow rate in all the passages.

In non-preferred alternatives, the primary passages of a same plate may communicate with each other, and/or the secondary passages of a same plate may be entirely separated from each other. These alternatives may in particular be examined for applications other than the steam generator.

Typically, the plates of the exchanger are welded together by diffusion bonding

This gives the possibility of assembling in a very solid way the plates to each other. This is particularly important when the pressure deviation between the primary fluid and the secondary fluid is high. In certain applications, this pressure difference may be greater than 100 bars.

According to a second aspect, the invention relates to a nuclear reactor, comprising:
- a vessel;
- a core positioned in the vessel;
- at least one heat exchanger having the above characteristics, positioned in the vessel, the heat exchanger hanging from the vessel at the secondary discharge collector.

The exchanger is thus maintained as a cantilever relatively to the vessel, by attachment points placed around the outlet of the secondary discharge collector. This supporting method allows the heat exchanger to expand downwards under the effect of thermal expansion.

Moreover, by attaching the exchanger to the wall of the vessel with a single attachment device, it is possible to lay out several heat exchangers at the periphery of the vessel, and to leave the centre of the vessel free, which allows implantation of other internal members.

BRIEF SUMMARY OF THE DRAWINGS

Other features and advantages of the invention will become apparent from the detailed description which is given thereof below, as an indication and by no means as a limitation with reference to the appended figures, wherein.

DETAILED DESCRIPTION

Figure 1:
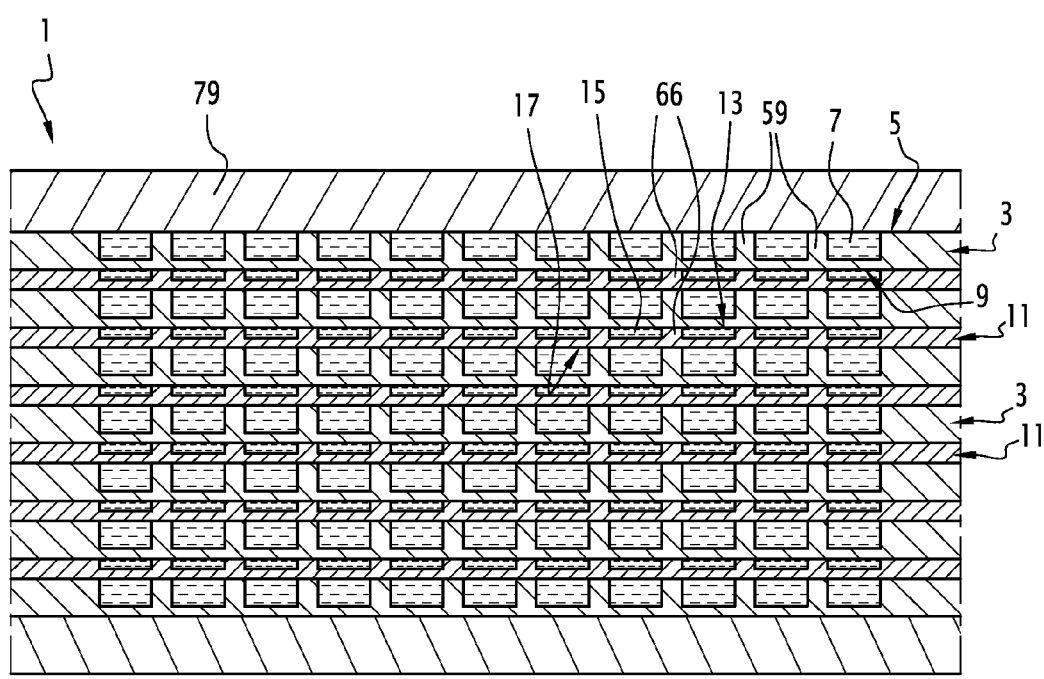
FIG. 1 is a schematic sectional illustration of the heat exchanger according to an embodiment of the invention.

The plate exchanger 1 illustrated in FIG. 1 is a steam generator intended to be implanted in the vessel of a nuclear reactor of small or medium size.

The exchanger 1 includes:
- a plurality of primary plates 3, each primary plate 3 having a first large face 5 in which are made a plurality of primary passages 7 provided for circulation of the primary fluid of the nuclear reactor, and a second large face 9, opposite to the first and without any primary passages;
- a plurality of secondary plates 11, each secondary plate 11 having a first large face 13 in which are made a plurality of secondary passages 15 provided for the circulation of the secondary fluid of the nuclear reactor, and a second large face 17, opposite to the first and without any secondary passage;
- first and second collectors 19 and 21 for supplying the secondary passages 15 with secondary fluid; and
- a single collector 23 for discharging the secondary fluid leaving secondary passages, into which open the secondary passages 15.

As visible in FIG. 1, the primary and secondary plates 3 and 11 are stacked on each other alternately, each primary plate being surrounded by two secondary plates and vice versa. The primary passages 7 are channels cut in the first large face 5 of each primary plate. These channels are opening channels at both of their opposite ends. They are open at the first large face 5. The direction of circulation of the primary fluid is illustrated by arrows in FIG. 2.

Also, the secondary passages 15 are channels cut in the first large face 13 of each secondary plate 11. At their upstream ends 25, they open into one of the two secondary supply collectors 19 or 21. At their downstream ends 27, they open into the secondary discharge collector. Each secondary channel 15 is open at the large face 13. The direction of circulation of the secondary fluid is illustrated by arrows in FIG. 3.

The primary and secondary plates 3 and 11 are stacked so that the second large face 9 of a given primary plate is applied against the first large face 13 of the secondary plate located just below. Also, the second large face 17 of the secondary plate is applied against the first large face 5 of the primary plate located just below it. Thus, the primary passages 7 are closed at the first large face 5 by the secondary plate located just above. Also, the secondary passages 15 are closed at the first large face 13 by the primary plate located just above.

The primary and secondary plates 3 and 11 are welded to each other by diffusion bonding.

Figure 2:
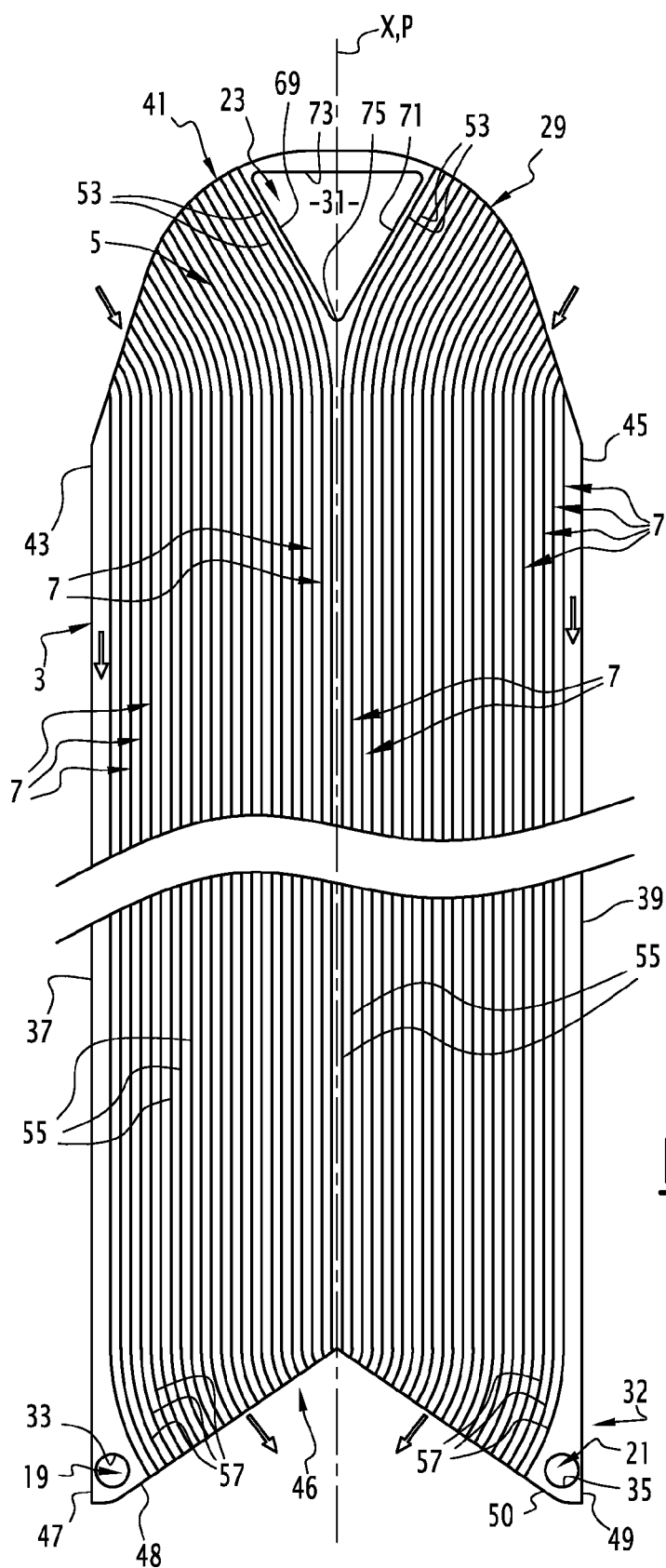
FIGS. 2 and 3 are front faces of the primary and secondary plates on the side where the primary and secondary passages are dug.
Figure 3:
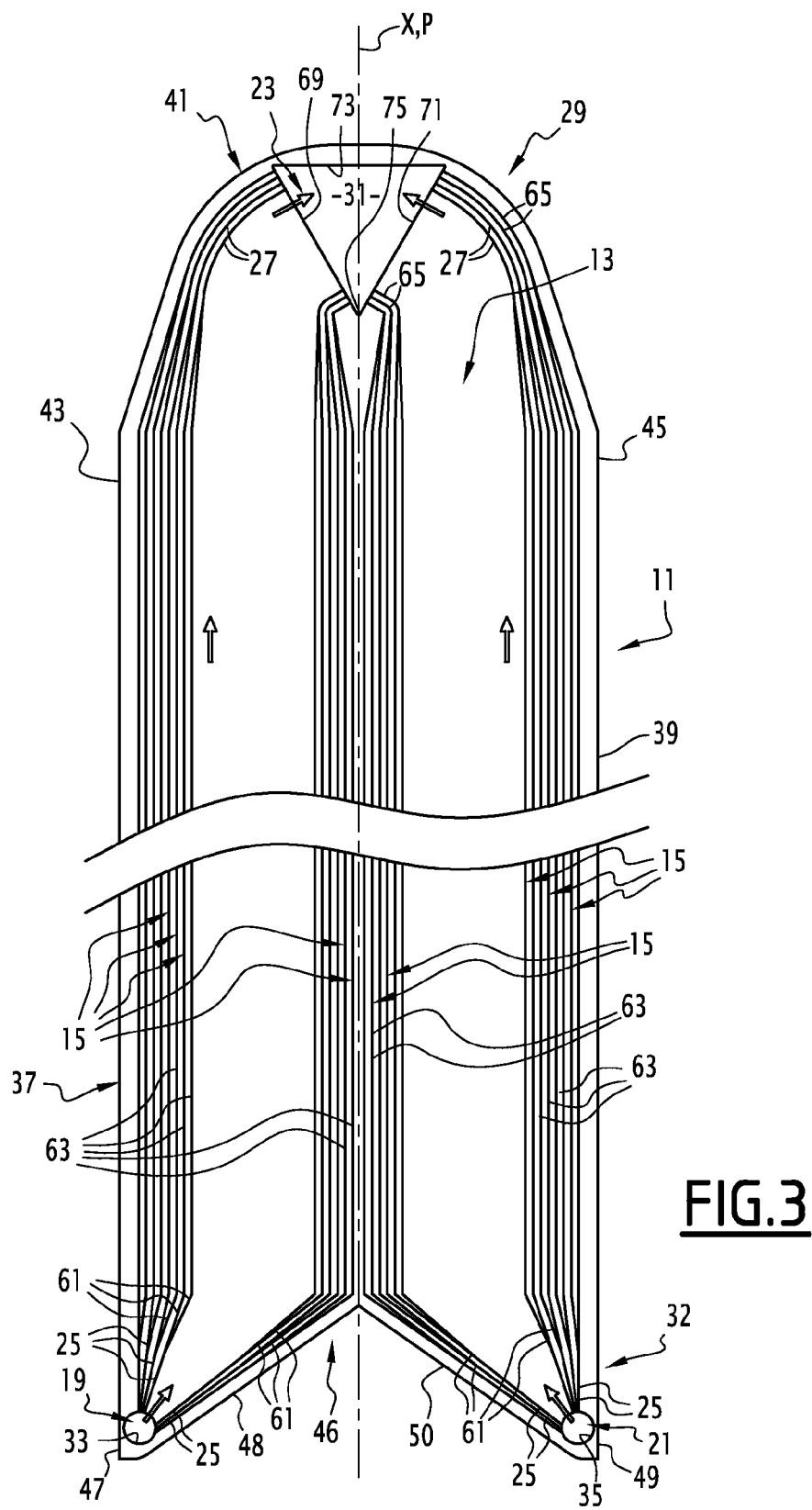

As visible in FIGS. 2 and 3, the primary and secondary plates 3 and 11 substantially have the same shape. These plates are elongated along a longitudinal axis X. They are all parallel with each other. They are substantially symmetrical relatively to a middle plane P, containing the longitudinal axis X and substantially perpendicular to the plates.

The secondary discharge collector 23 is located at a first longitudinal end 29 of the plates. More specifically, each plate has a triangular aperture 31 cut out at its first end 29, the apertures 31 of the different plates being placed so as to coincide with each other. The apertures 31 together define the collector 23. They are placed on the middle plane P.

Alternatively, the apertures 31 are not of a triangular shape, but for example are rectangular or of any other suitable shape.

On the contrary, the first and second secondary supply collectors 19 and 21 are placed at the second longitudinal end 32 of the plates. They are symmetrically placed relatively to the middle plane P and to each other. They are away from this plane P.

Each plate has two apertures 33, 35, the apertures 33, 35 cut out in the different plates are placed so as to coincide with each other. They define together the collectors 19 and 21 respectively.

As visible in FIGS. 2 and 3, each plate is delimited by two longitudinal straight edges 37 and 39 parallel and opposite to each other, an arched edge 41 connecting first respective ends 43 and 45 of the edges 37 and 39 to each other, and a V-shaped drawn-in edge 46 connecting respective second ends 47, 49 of both edges 37 and 39 to each other. The arched edge 41 delimiting the first end 29 of the plate. It is convex outward from the plate. The V-shaped edge 46 longitudinally points towards the first end 29 of the plate. It delimits the second end 32 of the plate. It includes two wings

48, 50 which join up at a top located in the middle plane P. The wing 48 delimits with the end 47 a triangular area in which is made the cut out 33. Symmetrically, the wing 50 delimits with the end 49 a triangular area in which is made the cut out 35.

Alternatively, the edge 41 is not arched and consists of one or more straight line segments.

As visible in FIGS. 2 and 3, the aperture 31 is triangular and has the shape of an isosceles triangle. It longitudinally points towards the second end of the plate.

As visible in FIG. 2, the primary channels 7 extend parallel to each other along a general longitudinal direction. They each have an upstream end opening at the arched edge 41. They also each have a downstream end opening at the V-shaped edge 46. More specifically, each of the primary passages 7 located on the left of the middle plane P have an upstream end opening in an area of the edge 41 located between the longitudinal edge 37 and the aperture 31. The downstream ends open at the wing 48. Conversely, the primary passages located on the right of the middle plane P have an upstream end which opens in the area of the edge 41 located between the longitudinal edge 39 and the aperture 31. Their downstream ends open at the wing 50 of the V-shaped edge 46.

Each primary passage 7 has an upstream portion 53 at least partly arched extending over the first end 29 of the plate, a rectilinear and longitudinal middle portion 55, and an at least partly arched downstream portion 57, extending over the second end 32 of the plate. The curvature of the upstream portion 53 is the reciprocal of the curvature of the downstream portion 57. In other words, if the upstream portion is turned towards the longitudinal edge 37, the downstream portion 57 is turned towards the middle plane P. Thus, the primary passages which are relatively close to the longitudinal edges 37 and 39 have relatively shorter upstream segment 53 and relatively longer downstream segment 57. Conversely, the primary passages located in proximity to the middle plane P have relatively longer upstream segments and relatively shorter downstream segments. Thus, all the primary passages substantially have the same developed length.

Figure 4:
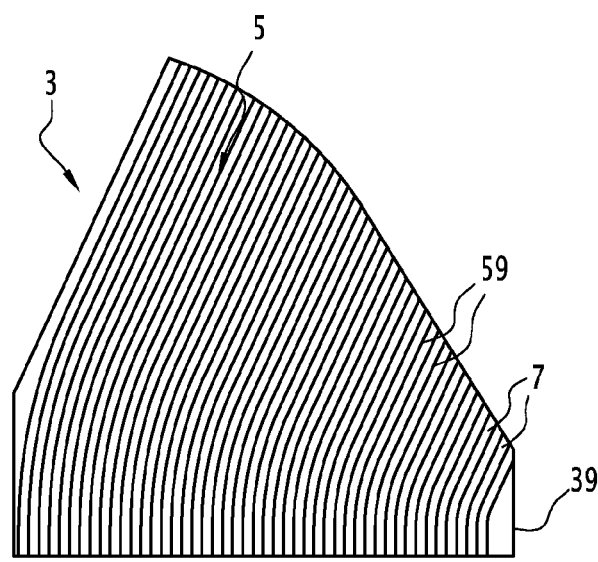
FIG. 4 is an enlarged view of a portion of the primary plate illustrated in FIG. 2.

As visible in FIG. 4, the primary passages are entirely separated from each other. More specifically, they are separated from each other by continuous isthmi 59, each isthmus 59 separating two primary passages 7 close to each other. The isthmi 59 are welded by diffusion bonding to the second large face of the plate located just above.

The secondary supply collectors 19 and 21 are fed with secondary fluid through a conduit, not shown, which crosses the wall 87. This distribution of the secondary fluid may be accomplished with several tubes in parallel between the crossing of the wall 87 and the collectors 19 and 21.

As visible in FIG. 3, the secondary passages 15 each have an upstream segment 61, opening into one of the two secondary supply collectors 19, 21 and extending over the second end 32 of the plate, a rectilinear and longitudinal middle segment 63, extending facing the edges 37 and 39, and a downstream segment 65 opening into the secondary discharge collector 23 and made on the first end 29 of the plate.

The segments 61 extend, from the collectors 19 or 21, towards the middle plane P and towards the first longitudinal end 39 or 37. The segments 61 of the secondary passages located the nearest to the longitudinal edges 37 and 39 are relatively shorter, while the upstream segment 61 of the secondary passages located the closest to the middle plane are relatively longer.

Conversely, the downstream segment 65 of the passages located the closest to the longitudinal edges 37 and 39 are relatively longer while the segment 65 of the passages located the closest to the middle plane P are relatively shorter. Thus, the secondary passages all substantially have the same developed length.

The downstream segments 65 have an arched portion, with curvatures turned towards the middle plane P. Moreover, they also comprise a rectilinear portion either longitudinal or converging towards the middle plane P when they are followed along the direction of circulation of the secondary fluid.

The number of secondary passages is substantially constant in the middle portion of the secondary plate 11, and for example has the value of 136.

On the other hand, the number of secondary passages will increase from each of the collectors 19, 21 towards the middle portion of the plate. Thus, the plate for example includes 4 segments 61 in close proximity to each of the collectors 19, 21. These segments 61 are subdivided as one gradually moves away from the collectors 19, 21, thereby increasing the number of secondary passages. This change is schematically illustrated in FIG. 3, and more specifically in FIG. 6. [Please complete FIG. 6 by showing how the diaphragms are formed].

Conversely, the number of downstream segment 65 decreases upon gradually approaching the discharge collector 23. In close proximity to the collector 23, the number of downstream segments 65 is for example 104. This change is schematically illustrated in FIG. 3, and more specifically in FIG. 5.

Consequently, the passage section provided to the secondary fluid immediately downstream from the collectors 19, 21 is reduced. The upstream ends of the secondary passages thus form a diaphragm allowing the pressure of secondary fluid to be kept at a high level in the collectors 19, 21. This effect is further enhanced by the fact that the four segments 61, in close vicinity to the collector 19, 21, have a particularly small section, which increases when one moves from away from the collector 19, 21.

Figure 5:
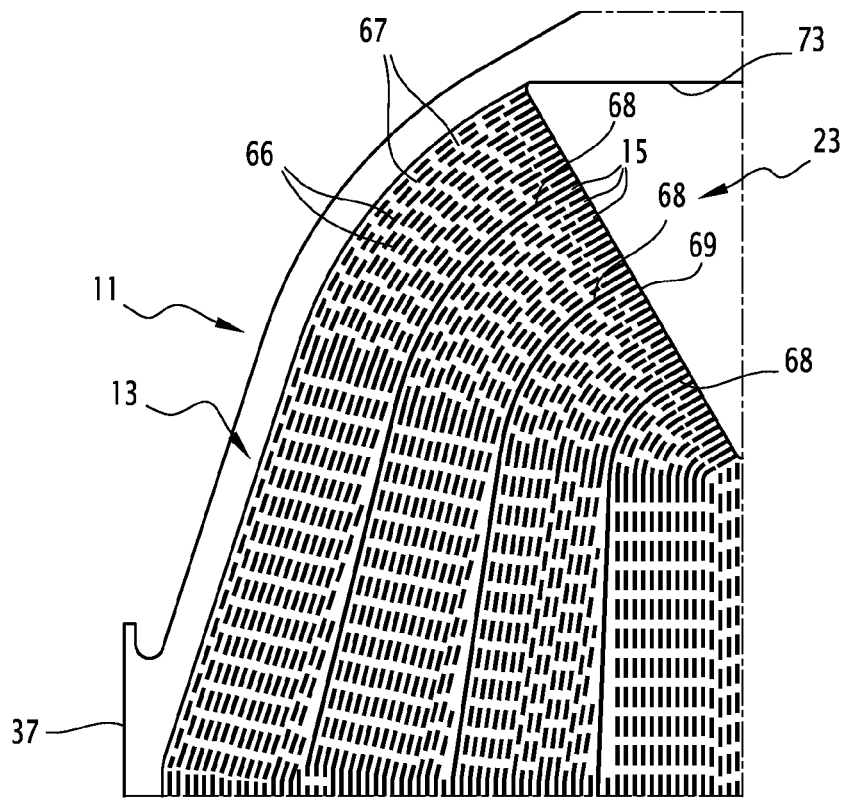
FIGS. 5 and 6 are enlarged views of two portions of the secondary plate illustrated in FIG. 3.
Figure 6:
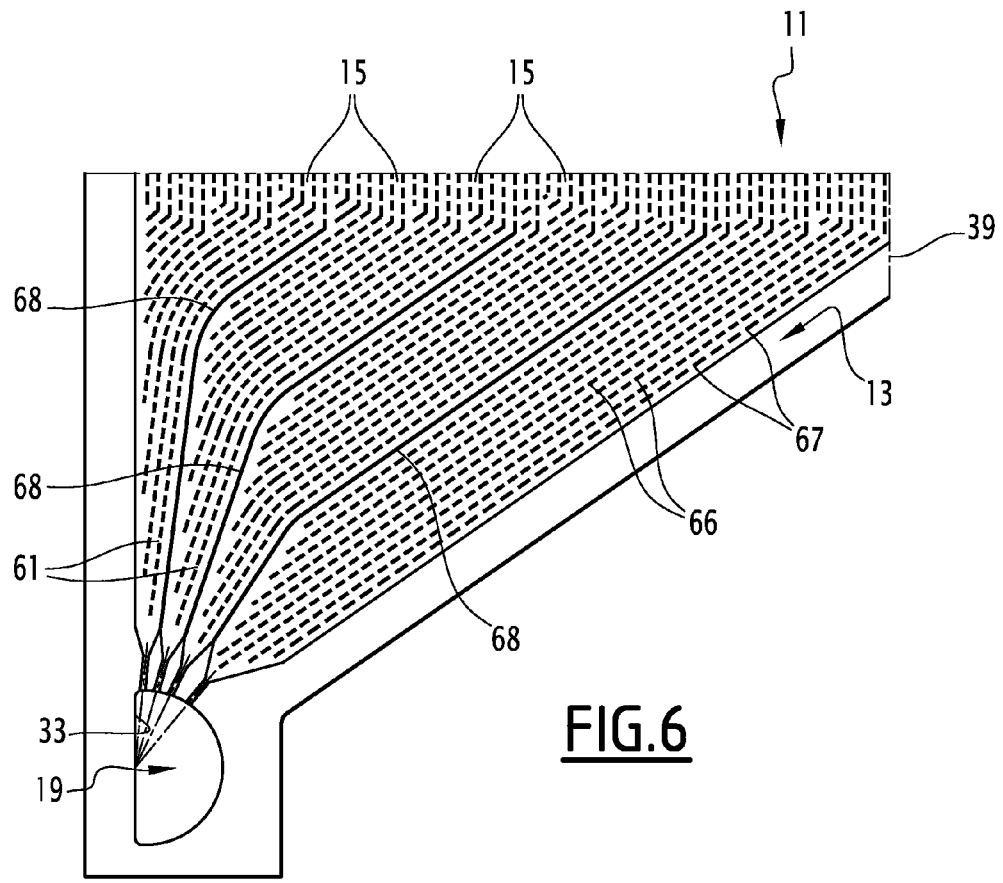

As visible in FIGS. 5 and 6, the secondary passages 15 communicate with each other. In the middle portion of the plate, they are separated from each other only by discontinuous isthmi 66. These isthmi 66 have interruptions 67, through which the secondary fluid may pass from a secondary passage to another.

Between the secondary supply collectors 19, 21 and the middle portion, the secondary passages are separated from each other both by discontinuous isthmi 66 and by continuous isthmi 68. In the illustrated example, the secondary plate has three continuous isthmi 68 for each secondary supply collector 19, 21. These isthmi are regularly spaced apart from each other. Thus, in proximity of the middle portion, nine discontinuous isthmi are found between two continuous isthmi.

Also, between the middle portion and the secondary discharge collector 23, the secondary passages are separated from each other both by discontinuous isthmi 66 and by continuous isthmi 68. In the illustrated example, the secondary plate has three continuous isthmi 68 on each side of the middle plane P. These isthmi are regularly spaced apart from each other. Thus, in proximity to the middle portion, are found twelve discontinuous isthmi between two continuous isthmi.

The isthmi 66 and 68 are welded by diffusion bonding to the second large face of the primary plate located just above.

The secondary discharge collector 23 is delimited by three planar surfaces, referenced as 69, 71 and 73 respectively and a bottom partition, provided by the plate 79. The planar surfaces 69 and 71 are tilted relatively to each other and converged towards an edge 75 longitudinally pointing towards the second end 32 of the plates. The secondary channels 15 located on the left of the middle plane P all open onto the surface 69, while the secondary channels located on the right of the middle plane P all open onto the surface 71.

Figure 7:
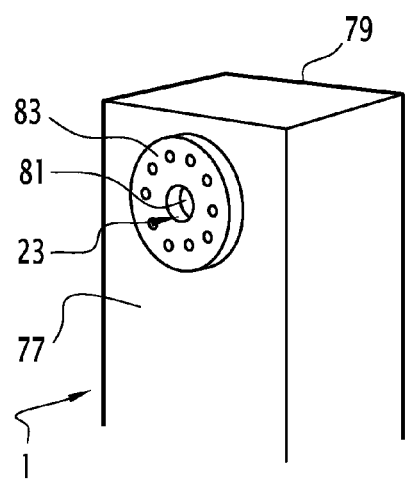
FIG. 7 is a partial perspective view of the heat exchanger according to an embodiment of the invention.

The heat exchanger typically includes, in addition to the primary and secondary plates 3 and 11, flattened external plates 77 and 79, one above and the other below the stack of primary and secondary plates. As visible in FIG. 7, the external plate 77 has an outlet orifice 81 for the secondary fluid. The orifice 81 is placed in the extension of the secondary discharge collector 23. The latter is open towards the orifice 81 and closed at its opposite end. The plate 77 has around the orifice 81 an overthickness forming a flange 83 provided for attaching the heat exchanger onto the wall of the vessel of a reactor. The plate 79 forms a wall at the bottom of the secondary discharge collector 23.

Figure 8:
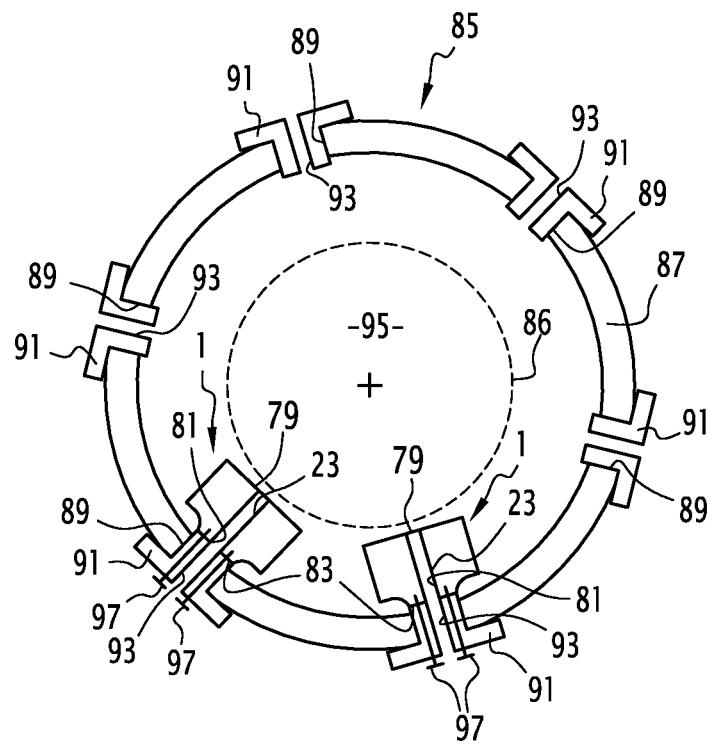
FIG. 8 is a simplified schematic illustration of several heat exchangers positioned in the vessel of a nuclear reactor.

As visible in FIG. 8, the heat exchanger 1 is provided so as to be positioned inside the vessel 85 of a nuclear reactor. The vessel 85 is delimited by a peripheral wall 87 having several apertures 89 regularly distributed around its central axis. Crossbars 91 are engaged into apertures 89 and are provided both for attaching the exchanges 1 and for the passage of the secondary fluid. The crossbars 91 interiorly delimit a passage 93.

Several heat exchangers 1 are distributed around the vessel, in proximity to the wall 87. Thus, the centre 95 of the vessel is cleared, the heat exchangers only occupying the periphery of this vessel. Each heat exchanger 1 is rigidly attached to the vessel via the flange 83. The flange 83 is flattened against the internal end of the crossbar 91 and rigidly attached to the crossbar 91 via tie rods 97. In this situation, the outlet orifice 81 of the secondary fluid coincides with the passage 93. The passage 93 crosses the crossbar 91 right through and opens outside the vessel, into a conduit belonging to the secondary circuit of the nuclear reactor. This conduit is not illustrated. The heat exchanger 1 is attached to the vessel only via tie rods 97 positioned at the outlet 81 and at the passage 93. Such an arrangement allows the exchanger to be maintained in a cantilever position, near the wall of the vessel, and thus allows the centre of the vessel to be cleared. The exchanger is free to expand downwards under the effect of thermal expansion.

The core 86 of the reactor is placed in a lower portion inside the vessel 85. Several heat exchangers 1 are placed above the core.

Figure 9:
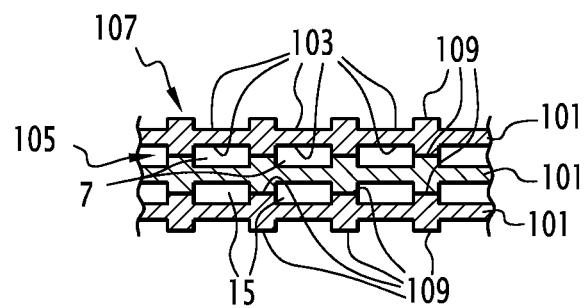
FIG. 9 is a schematic sectional illustration of an area of the heat exchanger, for an alternative embodiment of the primary and secondary passages.

In the alterative embodiment of FIG. 9, the plates 101 of the heat exchanger bear grooves 103 on their two large opposite faces 105, 107. The grooves 103 are separated from each other by isthmi 109. These grooves 103 coincide with each other when the plates 101 are stacked, as well as the isthmi 109. The grooves 103 facing each other located between two given plates 101, at a primary level, define primary passages 7. The grooves 103 facing each other located between two given plates 101, at a secondary level define secondary passages 15.

What is claimed is:

1. A plate heat exchanger comprising:
a plurality of plates stacked upon each other, the plates delimiting between them alternately a plurality of primary passages and a plurality of secondary passages, the primary passages being provided for circulation of a primary fluid and the secondary passages being provided for the circulation of a secondary fluid, the plates being parallel to a determined longitudinal axis and having a common middle plane containing the longitudinal axis;
a first secondary supply collector for supplying the secondary passages with the secondary fluid and a secondary discharge collector for discharging the secondary fluid, the first secondary supply collector and the secondary discharge collector opening into the secondary passages;
a second secondary supply collector, the first and second secondary supply collectors and the secondary discharge collector being made in the plates and substantially extending perpendicularly to the plates, the secondary discharge collector being located at a first longitudinal end of the plates in the common middle plane, the first and second secondary supply collectors being located at a second longitudinal end of the plates opposite to the first longitudinal end, symmetrically relatively to the middle plane and away from the common middle plane,
wherein the secondary passages include a first group of secondary passages fluidly connecting the first secondary supply collector to the secondary discharge collector and a second group of secondary passages fluidly connecting the second secondary supply collector to the secondary discharge collector,
the first group of secondary passages having a first total passage section at half-length between the first secondary supply collector and the secondary discharge collector,
the second group of secondary passages having a first total passage section at half-length between the second secondary supply collector and the secondary discharge collector,
the first group of secondary passages having a second total passage section at the output of the first secondary supply collector of less than 10% of the first total passage section of the first group of secondary passages, and
the second group of secondary passages having a second total passage section at the output of the secondary supply collector of less than 10% of the first total passage section of the second group of secondary passages.

2. The exchanger as recited in claim 1 wherein the primary and secondary passages are hollowed out faces of the plates, respectively.

3. The exchanger as recited in claim 1 wherein the secondary passages have respective developed lengths comprised between L0+10% and L0−10%, where L0 is a predetermined reference length and the developed length is a length covered when a secondary passage is followed from one of the secondary supply collectors as far as the secondary discharge collector.

4. The exchanger as recited in claim 1 wherein the primary passages have respective developed lengths comprised between L1+10% and L1−10%, where L1 is a predetermined reference length and the developed length is a length covered when a primary passage is followed from an upstream end to a downstream end.

5. The exchanger as recited in claim 1 wherein the secondary discharge collector has a V-shaped cross section.

6. The exchanger as recited in claim 1 wherein the secondary discharge collector is delimited by two planar surfaces tilted relatively to each other, the secondary passages opening in either one of the two planar surfaces.

7. The exchanger as recited in claim 1 wherein the first and second secondary supply collectors have together a first total passage section, the secondary discharge collector having a second passage section greater than three times the first total passage section of the first and second secondary supply collectors.

8. The exchanger as recited in claim 1 wherein the secondary passages include a first number of secondary passages at half-length between the first and second secondary supply collectors and the secondary discharge collector, the secondary passages including a second number of secondary passages opening into the secondary discharge collector, the second number being comprised between 70% and 100% of the first number.

9. The exchanger as recited in claim 1 wherein the primary passages delimited between two of the plates are entirely separate from each other.

10. The exchanger as recited in claim 1 wherein the secondary passages delimited between two of the plates communicate with each other.

11. The exchanger as recited in claim 10 wherein the secondary passages include, between two of the plates, a first number of secondary passages substantially constant in a middle portion between the first and second secondary supply collectors and the secondary discharge collector, the number of secondary passages being reduced in a second portion upon approaching the secondary discharge collector from the middle portion, the secondary passages being separated in the second portion both by discontinuous isthmi and by continuous isthmi from the middle portion to a the secondary discharge collector.

12. The exchanger as recited in claim 10 wherein the secondary passages include, between two of the plates, a first substantially constant number of secondary passages in a middle portion between the first and second secondary supply collectors and the secondary discharge collector, the number of secondary passages increasing in a third portion upon approaching the middle portion from the first and second secondary supply collectors, the secondary passages being separated in the third portion both by discontinuous isthmi and by continuous isthmi from the first and second secondary supply collectors to the middle portion.

13. The exchanger as recited in claim 1 wherein the plates are welded to each other by diffusion bonding.

14. A nuclear reactor, comprising:
a vessel;
a core positioned in the vessel; and
at least one of the heat exchanger as recited in claim 1 positioned in the vessel, the heat exchanger hanging from the vessel from the secondary discharge collector.

* * * * *